(12) United States Patent
Arnold, IV et al.

(10) Patent No.: US 7,727,078 B2
(45) Date of Patent: Jun. 1, 2010

(54) CHILD SEAT CANOPY ILLUMINATION AND MEDIA PROJECTION

(75) Inventors: John (Jason) C. Arnold, IV, Philadelphia, PA (US); Joshua E. Clapper, Exeter, PA (US); Brian Kincaid, Philadelphia, PA (US); Matthew J. Ransil, Richland, PA (US); James E. Godiska, Exton, PA (US)

(73) Assignee: Graco Children's Products Inc., Exton, PA (US)

( * ) Notice: Subject to any disclaimer, the term of this patent is extended or adjusted under 35 U.S.C. 154(b) by 344 days.

(21) Appl. No.: 11/932,409

(22) Filed: Oct. 31, 2007

(65) Prior Publication Data

US 2008/0143155 A1   Jun. 19, 2008

Related U.S. Application Data

(60) Provisional application No. 60/920,016, filed on Mar. 26, 2007, provisional application No. 60/855,894, filed on Oct. 31, 2006.

(51) Int. Cl.
*A63G 9/00* (2006.01)
*A63G 31/00* (2006.01)

(52) U.S. Cl. .................... 472/118; 472/61; 472/119; 446/227

(58) Field of Classification Search ......... 472/118–125, 472/59–61, 130; 446/227
See application file for complete search history.

(56) References Cited

U.S. PATENT DOCUMENTS 4,939,582 A    7/1990  Holdredge et al.
6,269,496 B1 *  8/2001  Kuenkes ...................... 5/93.1
6,386,986 B1 *  5/2002  Sonner et al. ............... 472/119
6,939,194 B2 *  9/2005  Bapst et al. ................. 446/227
2002/0140260 A1  10/2002  Osato
2003/0201662 A1 * 10/2003  Armbruster et al. ......... 297/295
2006/0260663 A1  11/2006  Sejnowski et al.

(Continued)

FOREIGN PATENT DOCUMENTS

BE    502 897    5/1951

(Continued)

OTHER PUBLICATIONS

International Search Report and Written Opinion issued in International Application No. PCT/US2007/083231 mailed Jun. 3, 2008.

(Continued)

*Primary Examiner*—Kien T Nguyen
(74) *Attorney, Agent, or Firm*—Lempia Braidwood LLC

(57) ABSTRACT

A juvenile product includes a seat having a seating area supported by a part of the juvenile product, a canopy positionable over at least a portion of the seating area and having an underside that faces the seating area, and a projection system carried on the juvenile product. The projection system has a projector configured to project visible stimuli either above the seating area or onto at least part of the underside of the canopy. These and other aspects of the disclosure are directed to providing a soothing and entertaining environment that may also be adjustable or customizable to address the changing interests and developmental levels of a child occupant.

13 Claims, 14 Drawing Sheets

U.S. PATENT DOCUMENTS

2007/0111809 A1    5/2007   Bellows et al.

FOREIGN PATENT DOCUMENTS

| DE | 202 06 392 | 8/2002 |
|---|---|---|
| DE | 103 05 289 | 8/2004 |
| GB | 2 220 278 | 1/1990 |
| JP | 05 161521 | 6/1993 |
| WO | WO 97/29822 | 8/1997 |
| WO | WO 03/100520 | 12/2003 |

OTHER PUBLICATIONS

Baby Einstein Discovering Water Rocker Seat Model #30744, www.kidsii.com, 3 pages (Sep. 13, 2007; copyright date 2001-2007).

Britax Instruction Manual, Platinum AHR Rowsgate #3446, Convertible Car Seat Child Restraint with AHR Headrest, www.britax.com.au, pp. 1, 2, 31 and 36 (2004-2005).

Kolcraft Jeep Overland Limited Jogging Stroller Model #JJ001, www.kolcraft.com, 4 pages (Sep. 13, 2007).

Lil' Laugh & Learn™ Sweet MoonDreams™ Mobile Model #L7334, www.fisher-price.com, 2 pages (Mar. 31, 2008).

Instruction Manual, Fisher Price Mobile Model #L7334, 12 pages (2007).

Instruction Manual, Fisher Price Cradle Swing Model #G2609, 24 pages (2007).

"Star-lite Swing—Baby play," Mamas & Papas Swing Model #470533500, www.mamasandpapas.co.uk, 2 pages (Mar. 31, 2008).

Instruction Manual, Mamas & Papas Swing Model #470533500, 11 pages (2006).

Tomy Baby Explore Lullaby Light Show, www.tomy-usa.com, 2 pages (2007).

Tomy Baby Explore Starbright Light Show, www.tomy-usa.com, 2 pages (2007).

International Preliminary Report on Patentability issued in International Application No. PCT/US2007/083231 and mailed Dec. 18, 2008.

* cited by examiner

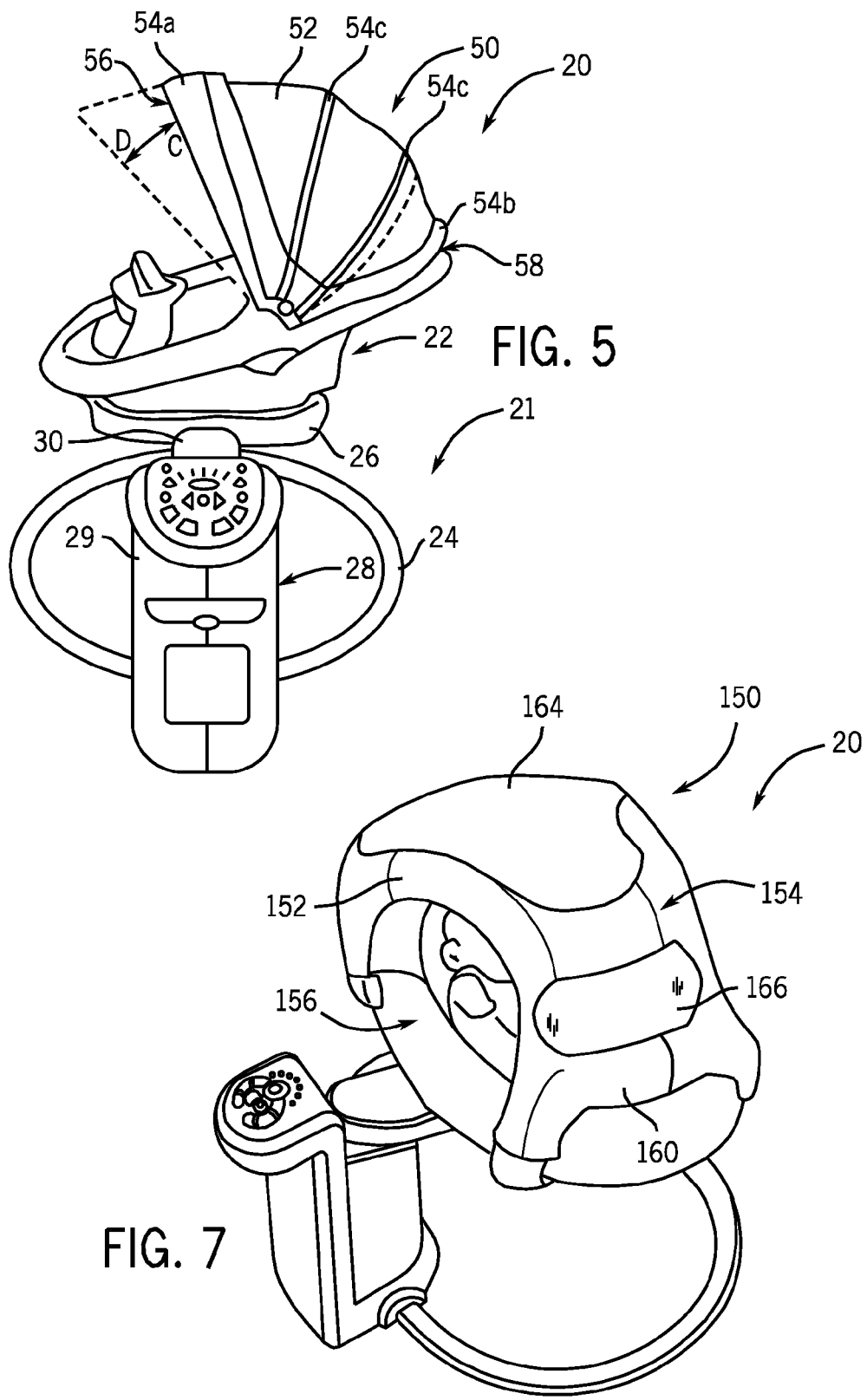

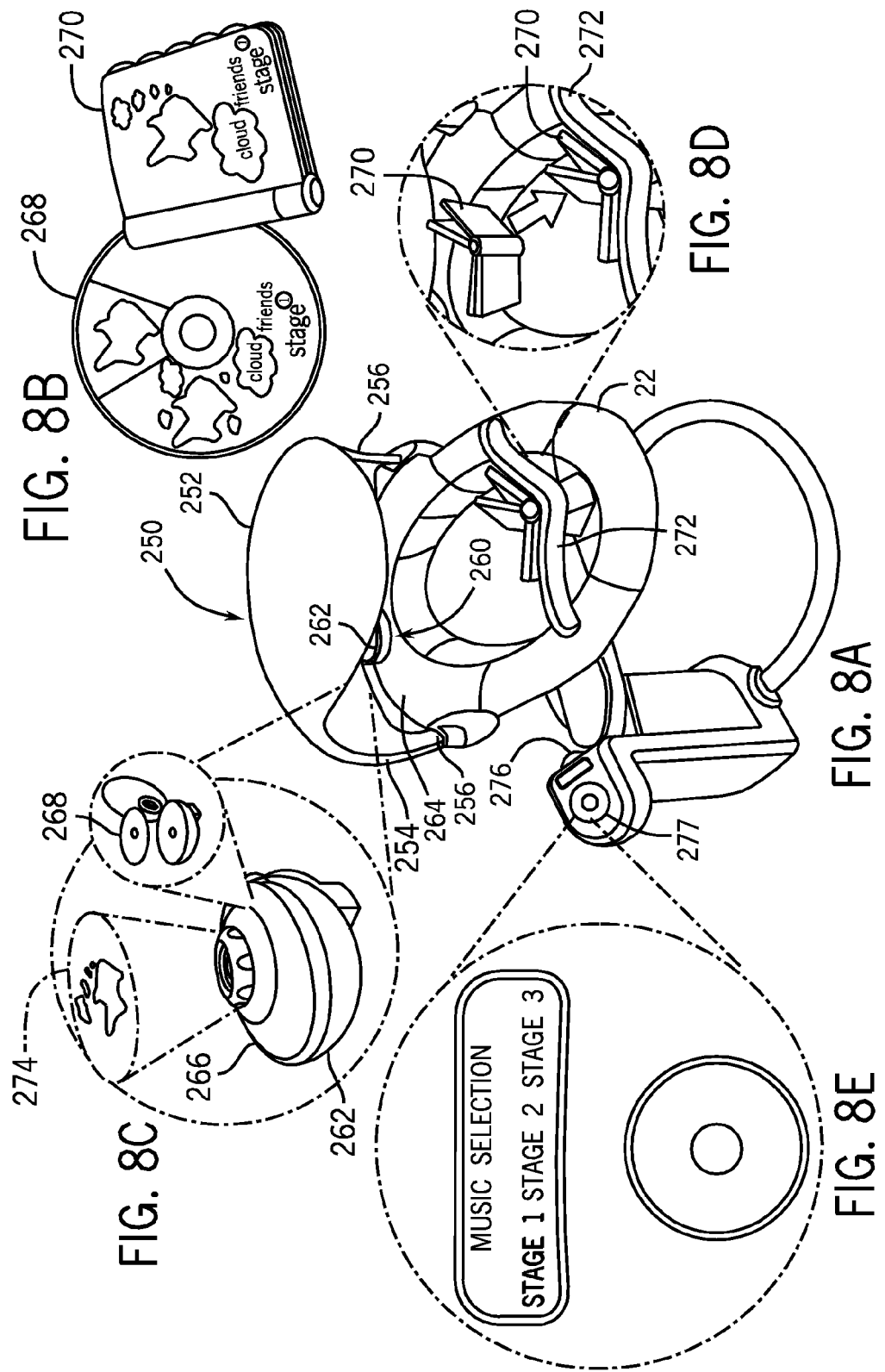

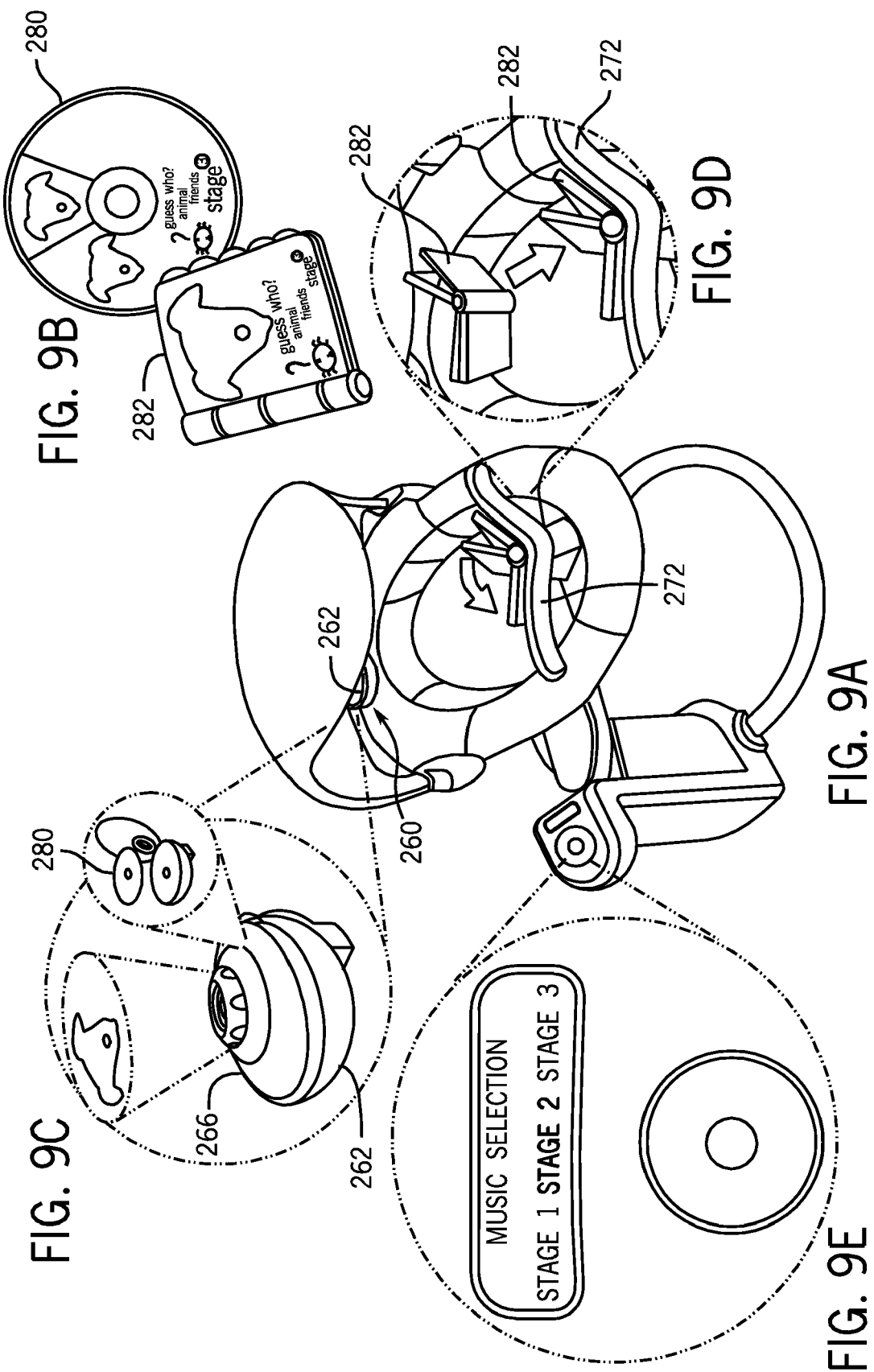

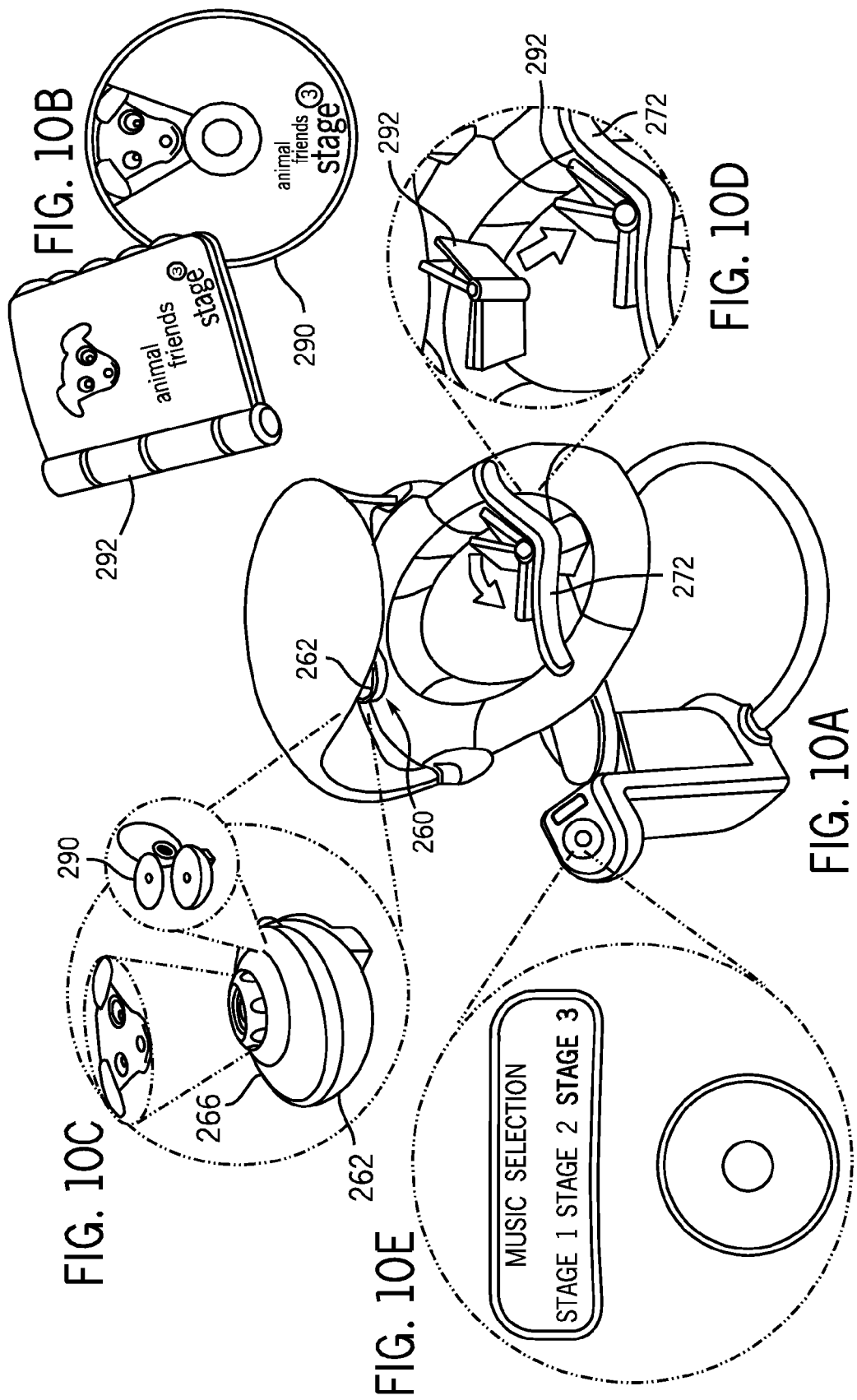

US 7,727,078 B2

CHILD SEAT CANOPY ILLUMINATION AND MEDIA PROJECTION

CROSS-REFERENCES TO RELATED APPLICATIONS

This application claims the benefit of U.S. provisional application Ser. No. 60/855,894, entitled "Motion Control Devices and Methods," and filed Oct. 31, 2006, and Ser. No. 60/920,016, entitled "Child Seat Canopy and Projection Systems," and filed Mar. 26, 2007, the entire disclosures of which are hereby expressly incorporated by reference.

BACKGROUND OF THE DISCLOSURE

1. Field of the Disclosure

The present disclosure is generally directed to juvenile products, and more particularly to systems, features, and related accessories for use on juvenile products such as strollers, swings, carriers, or other child motion or soothing products with a child seating area.

2. Brief Description of Related Technology

Many children's or Juvenile products are known in the art such as strollers, infant carriers, and the like that employ a canopy as a part of the product. The canopy is typically positioned such that it can be deployed to cover a part of the seating area. In most examples, the canopy has two or more bows that can pivot relative to one another and a fabric cover that extends between the bows. Often, a movable one of the bows can be collapsed toward a fixed one of the bows to stow the canopy or can be pivoted away from the fixed bow to partly or fully deploy the canopy. Sometimes more than two bows can be employed to create additional support for the canopy fabric. Sometimes all of the two or more bows are movable to permit a variety of different canopy positions, whether deployed, partly deployed, or stowed. Most canopies typically employ only enough fabric to deploy or expand to cover an overhead portion of the infant or child seating area. This is to provide shading to an infant or child within the seating area.

There are known juvenile products for infants and toddlers that include entertainment and/or soothing features and accessories. Some of these features include electronics configured to produce soothing, distracting, and/or entertaining sounds or physical motion stimuli for the child occupant of the seating area. Many of these juvenile products utilize such electronics to either provide motion to a part of the product, such as a swinging motion to a swing seat, or to provide audible sound stimuli for the occupant of the product.

These known features and accessories are typically rather limited in the range of motion and/or sounds that they produce to sooth, distract, or stimulate the occupant of the juvenile product. Several known products offer a limited user select ability to select from a limited range of alternative sounds or motion characteristics.

BRIEF DESCRIPTION OF THE DRAWING FIGURES

Objects, features, and advantages of the present disclosure will become F apparent upon reading the following description in conjunction with the drawing figures, in which like reference numerals identify like elements in the figures, and in which:

FIG. 5 shows a side view of the juvenile product shown in FIG. 1 with the canopy in a deployed position over the seat.

FIG. 7 shows a perspective view of a juvenile product having another alternative example of a canopy according to the teachings of the present invention.

FIG. 8A shows a top perspective view of a juvenile product with a projection system in accordance with the teachings of the present invention.

FIGS. 8B-8E show one example of various features of and images produced by a projection system and method in accordance with the teachings of the present invention.

FIGS. 9A-9E show various additional features of and images produced by the projection system and method represented in FIGS. 8A-8E.

FIGS. 10A-10E show still further features of and images produced by the projection system and method represented in FIGS. 8A-8E.

Figure 1:
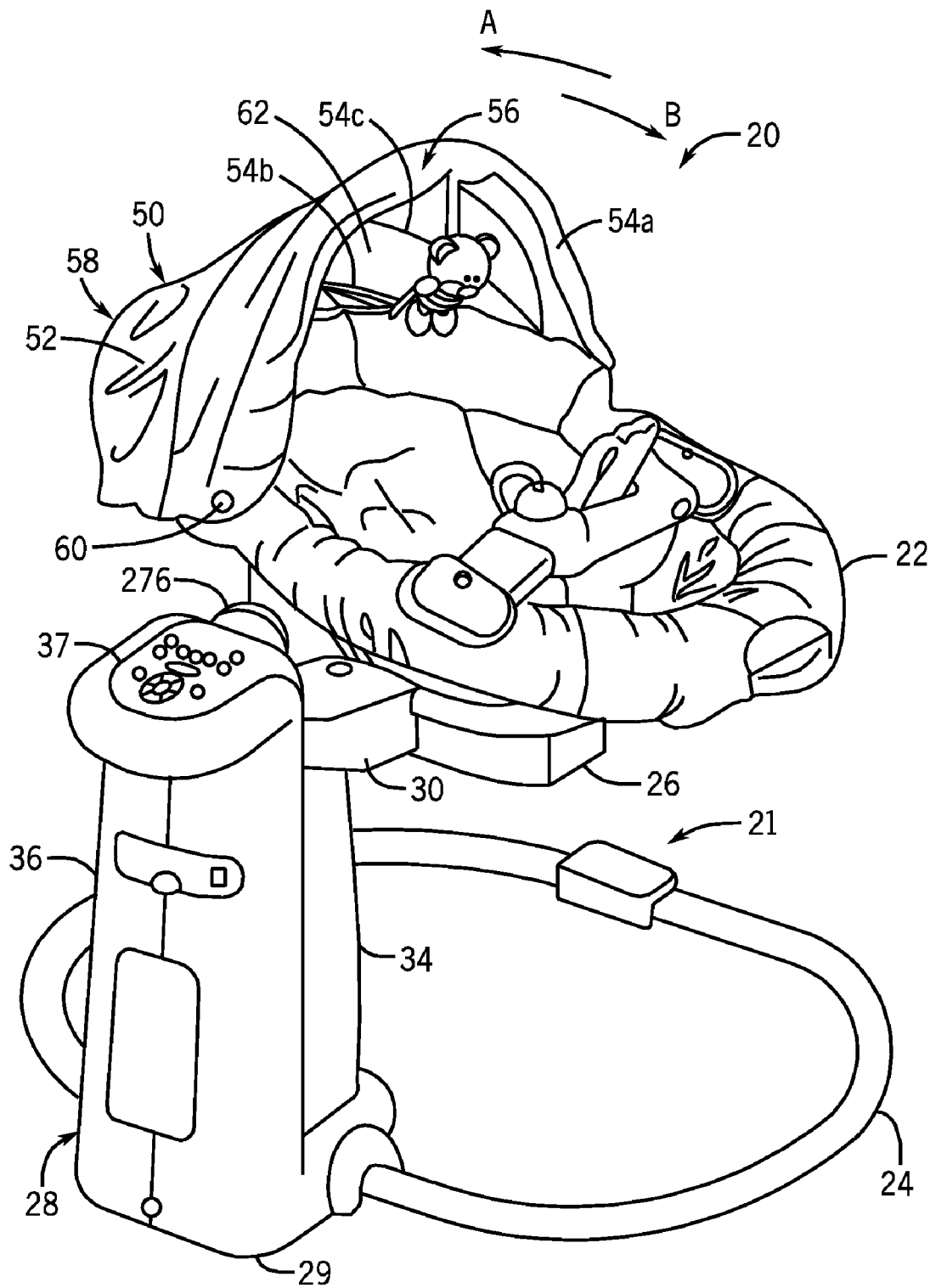
FIG. 1 shows a perspective view of one example of a juvenile product with features according to the teachings of the present invention.

While the disclosed systems, devices, and methods are susceptible of embodiments in various forms, there are illustrated in the drawings (and will hereafter be described) specific embodiments of the invention, with the understanding that the disclosure is intended to be illustrative, and is not intended to limit the invention to the specific embodiments described and illustrated herein.

DETAILED DESCRIPTION OF DISCLOSURE

The disclosed systems, devices, and methods solve or improve upon one or more of the above-noted problems and/or disadvantages in the prior known juvenile products. Several aspects of the disclosure are directed to juvenile products that provide a secure, comfortable, and soothing environment in an efficient and effective manner under a wide range of operating conditions. These aspects of the disclosure provide benefits to both the child and the caregiver by creating multiple, new ways for the caregivers to interact with their child and the device, and by providing new soothing features that will help calm a fussy child. The features may also be adjustable or customizable to address the changing interests and development levels of the child.

In one example, the juvenile product is equipped with a canopy that can be deployed to a position where at least a portion of its interior surface is readily visible to an occupant of the product. The juvenile product is also equipped with a system that can produce visual stimuli projected onto the visible portion of the canopy. In one example, the visual stimuli can be projected along with audio content that is audible to the occupant of the product. In one example, the visual stimuli can include one or more images projected onto the interior surface of the canopy for viewing by the occupant. In another example, the visual stimuli can be projected from a system device configured to periodically alter and/or move the images.

In some cases, the underlying data or information for the visual stimuli may be provided via variable (or non-fixed) media made available for selection by a caregiver. The media source(s) may be integrated with the juvenile product to any desired extent. In one example, the media is provided via portable, interchangeable discs or other types of media sources that are received by the juvenile product. Alternatively or additionally, the media may be provided via an external source (e.g., media playback device) coupled to, or otherwise in communication with, the juvenile product in a variety of ways.

Referring now to the drawings, FIGS. 1-4 illustrate one example of a juvenile product constructed in accordance with the teachings of the present invention. In this example, the juvenile product is a child motion device 20 incorporating various aspects of the disclosure. The device 20 in this example generally includes a frame assembly 21 configured to support an occupant seat 22 above a surface on which the device 20 rests. A base section 24 of the frame assembly 21 rests on the surface to provide a stable base for the device 20 while in-use. The frame assembly 21 also includes a seat support frame 26 on which the seat 22 is mounted. The seat frame 26 is generally suspended over the base section 24 and is configured and arranged to impart reciprocating movement of the seat 22 during operation. To that end, an upright post 28 of the frame assembly 21 extends upward from the base section 24 to act as a riser or spine for the device. A support arm 30 extends radially outward from the post 28 and is connected and supports the seat frame 26.

In this example, the post or spine 28 is oriented in a generally vertical orientation relative to its longitudinal length. The post 28 has an external housing 29 that may be configured in any desired or suitable manner to provide a pleasing or desired aesthetic appearance. The housing 29 can also be functional, or both functional and ornamental. For instance, the housing 29 can act as a protective cover for the internal components, such as the drive system, of the device 20. Some or all of the housing 29 may constitute a removable cover for access to the interior or inner workings of the device 20, if needed. In any case, the housing 29 and, more generally, the post 28, may vary considerably in orientation, shape, size, configuration, and the like from the examples disclosed herein.

Other components of the frame assembly 21, such as the base section 24, may also vary considerably in orientation, size, shape, configuration, and the like. Practice of the disclosed systems, devices, features, and methods is not limited to the configuration of the exemplary frame assembly 21 described and shown in connection with FIGS. 1-3. In fact, other juvenile products can also employ and benefit from implementation of the disclosed systems, devices, features, and methods. Notwithstanding the foregoing, one or more components of the frame assembly 21 of the device 20 disclosed herein may be well suited for implementation of one or more aspects of the disclosure, as described below.

Figure 2:
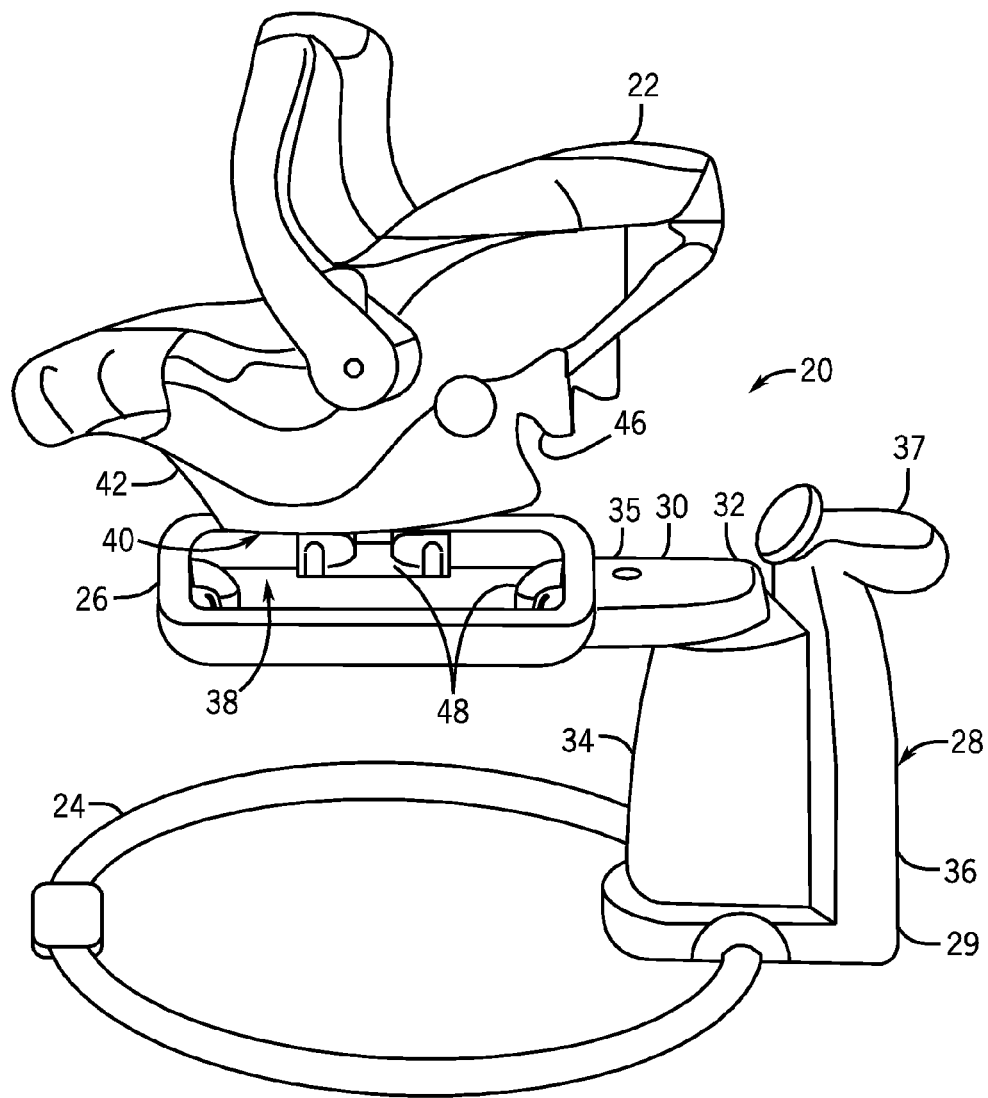
FIG. 2 shows a side view of the juvenile product shown in FIG. 1 and with the seat prior to installation on the device.
Figure 4:
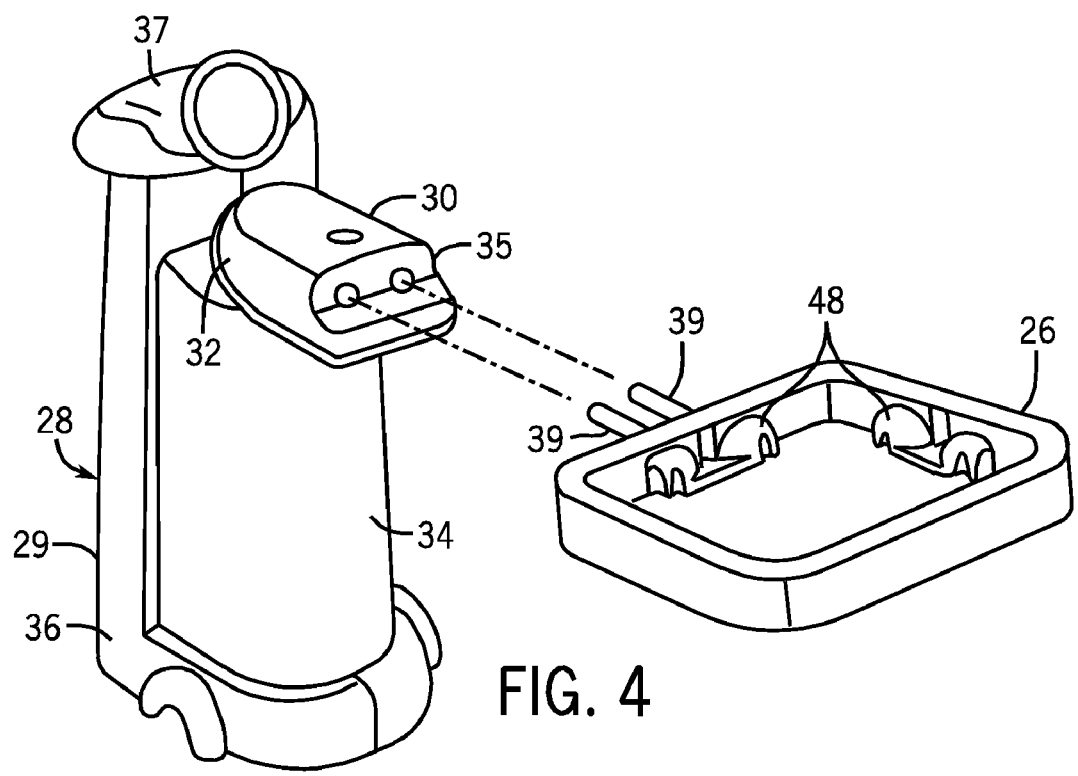
FIG. 4 shows the post or spine of the juvenile product shown in FIG. 1 and with the seat support arm removed from the post.

As best shown in FIGS. 2 and 4, a driven end 32 of the support arm 30 is coupled to a structural support, or weight bearing, portion 34 of the post 28. In this example, the support arm 30 is cantilevered from the post 28 at the driven end 32. The support arm 30 is mounted for pivotal, side-to-side movement about its driven end 32 through a travel path that is substantially horizontal. Further details regarding the travel path, as well as other exemplary travel paths, can be found in U.S. Patent Publication No. 2007/0111809, entitled "Child Motion Device," the entire disclosure of which is hereby incorporated by reference. As described therein, the support arm 30 can travel through a partial orbit or arc segment of a predetermined angle and can rotate about an axis of rotation that can be offset from a vertical reference and that can be offset from an axis of the post 28. Alternatively, the axis of rotation can be aligned with the vertical reference, the axis of the post 28, or both, if desired. More generally, the driven end 32 is coupled to a drive system (not shown) that is disposed within the housing 29 and configured to reciprocate or oscillate a distal end 35 of the support arm 30 to which the seat frame 26 is attached. This results in corresponding movement of the occupant seat 22 through the partial orbit.

As described below, the device 20 includes a number of components directed to controlling and/or facilitating the motion and other functionality of the device 20. In the example shown, several of these control components are disposed on or in a control portion 36 of the post 28. In some cases, the control portion 36 may also contain portions of the drive system or structural support elements of the device 20. In this example, the control portion 36 has an upper panel 37 to present an instrumentation, or control, interface to a caregiver directing the operation of the device 20. The positioning and configuration of the instrumentation and other interface elements may vary considerably from that shown. For instance, the instrumentation need not be arranged in a single panel, but rather may be distributed over multiple locations on the control portion 36 or other part of the housing 29 or component of the device 20. Further description of the elements and aspects of the user interface are set forth below.

Figure 3:
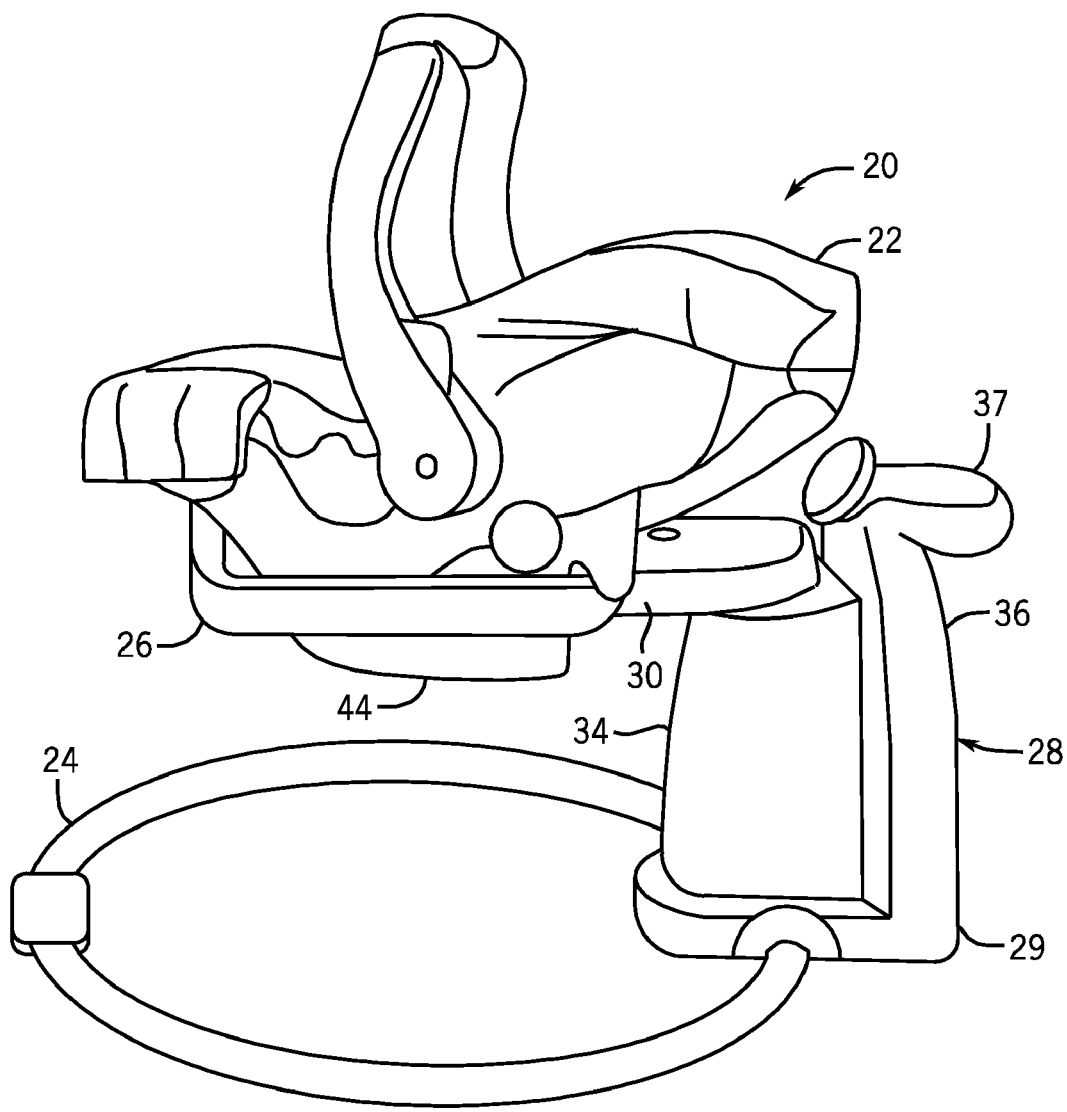
FIG. 3 shows a side view of the juvenile product shown in FIG. 2 with the seat installed.

In the example shown in FIGS. 1-3, the base section 24 of the frame assembly 21 is in the form of an oval hoop or ring sized to provide a stable base for the device 20 when in use. The configuration of the base section 24 can vary from the hoop as discussed in the above-referenced publication. The base section 24 is positioned generally beneath the seat support frame 26 in order to offset the load or moment applied to the post 28 and created by a child placed in the seat 22 of the cantilevered support arm 30

The seat support frame 26 may also vary considerably and yet fall within the spirit and scope of the present invention. In this example, the seat support frame 26 is a square or rectangular ring defining an opening 38 (see FIG. 2) to accept the seat 22. The seat frame 26 may have a pair of pins 39 extending outward from one side to engage corresponding, locking receptacles in the distal end 35 of the support arm 30, as shown in FIG. 4.

While other configurations and constructions of the seat support frame 26 are possible, the symmetrical shape of the disclosed seat support frame 26 permits the seat 22 to be mounted on the support arm 30 in a number of optional orientations. In this example, the child seat 22 can have a contoured bottom or base 40 with features configured to engage with portions of the seat support frame 26 so that when it is rested on the seat support frame, the child seat 22 is securely held in place. In one example, the seat support frame 26 can be formed of tubular, linear side segments arranged to form the square shape and the opening 38. The seat base 40 may have a number of side or end regions 42 that either rest on or engage respective linear side segments of the support frame 26. A depending region 44 (FIG. 3) of the seat base 40 can be sized to fit within the opening 38 of the support frame 26. The other end of the base 40 has one or more aligned notches 46 that are configured to receive the opposite linear side segment of the holder. The depending region 44 and the notches 46 can be configured to hold the child seat 22 in place on the holder. Gravity alone can be relied upon to retain the seat in position. In another example, one or more positive manual or automatic latches 48 (see FIG. 2) can be employed. In this example, the latches 48 are disposed as part of the seat support frame 26. Alternatively or additionally, the latches 48 may be formed as part of the seat 22, at one or both ends of the seat 22, and/or at one or more locations on the seat support frame 26 to securely hold the child seat 22 in place on the seat support frame. The latches 48 can be spring biased to automatically engage when the seat is placed on the holder.

The geometry and symmetry of the latches 48 and, more generally, the seat support frame 26, in this example allow the seat 22 to be placed in the holder in multiple optional seat orientations. In FIG. 1, the seat 22 is oriented such that a side of the seat is closest to the post. By de-coupling the seat 22 from the seat support frame 26, the seat may be re-oriented to the position shown in FIG. 3 such that the child is facing away from the post 28, or to other optional seat facing positions. Further information regarding the seat orientation options is set forth in the above-referenced publication. As also discussed therein, the seat 22 and/or the seat support frame 26 can also be configured to permit the inclination of the seat or the frame to be adjusted to various recline angles. More generally, the disclosed device may be well suited for use with a variety of seats, seat orientations, and seat mounting configurations. For example, in some cases, the seat frame 26 may be configured to accept and support a seat or other child carrying device from another product, such as a car seat.

As noted above, the device 20 is shown and described herein merely by way of example to assist in describing and showing the systems, devices, features, and methods in accordance with the teachings of the present invention. In other examples, the disclosed invention and its various aspects and alternatives may be employed on other juvenile products with a seating area and a canopy or other similar object or surface. For example, the disclosed invention may be employed on a more conventional pendulum style swing, a stroller, a playard, an infant carrier, or the like within the spirit and scope of the present invention.

In the present example, the device 20 also has a canopy 50 that is shown in FIG. 1 positioned generally over and spaced above the occupant seating area of the seat 22. It is sometimes desirable to include such a canopy that can cover a portion of the seat 22, or to cover a seat on a stroller, infant carrier, conventional pendulum swing, or the like. The canopy 50 may be either permanently attached to, relocate-able (pivotable, foldable, or retractable) on, or entirely detachable from the device 20. The canopy 50 is typically provided so as to be able to shade the seat occupant from the sun, to surround the occupant's head for soothing comfort, to shield the occupant's view of the surrounding environment so that the occupant can be less distracted, or the like. The canopy 50 or other canopy examples disclosed herein are configured to provide or assist in providing additional benefits, advantages, functions, and features not previously known for such juvenile products.

As generally shown in FIGS. 1 and 5, the canopy 50 can have a fabric material 52 extending over and across the seating area of the seat 22. The fabric material 52 can be supported by a plurality of curved bows 54a-54c or other structures as is known in the art. The bows are not directly illustrated in the drawings, as the bows are typically sewn into channels within the fabric material 52. The canopy 50 can have a front edge 56 and a rear edge 58 supported respectively by a front one of the bows 54a and a rear one of the bows 54b. The canopy 50 can optionally include one or more intermediate bows 54c positioned between the front and rear edges of the canopy, for additional support of the fabric material 52, particularly when the canopy 50 is relatively large. Each of the bows 54a-54b in the disclosed example, and in many known canopies, can each be pivotable about a pivot point 60 at their respective distal ends on opposite sides of the seat 22. In some canopy configurations, the rear bow 54b can be fixed in position with only the other bows 54a and 54c being pivotable relative to the fixed bow 54b. With many canopies, the rear edge 58 can often be seated against the seat back of the seat 22 to envelop the head of the seat occupant. In any case, the canopy 50 in this example includes an interior or underside surface 62 that faces the seating area of the seat 22.

In one example, the canopy 50 can be moved between a stowed configuration in the direction of the arrow A and a deployed or open position in the direction of the arrow B in FIG. 1. The underside surface 62 faces the seat 22 when deployed. In one example, the canopy 50 can be moved to a partly deployed or open position as shown in FIG. 1. In another example, the canopy 50 can be opened to a fully deployed or open position, such as that disclosed in FIG. 5. In yet another example, the entire canopy 50, when in be fully deployed or open position, can be moved between a position with the rear edge 58 against the seat 22 in the direction of the arrow C in FIG. 5 and a position with the rear edge spaced from the seat 22 in the direction of the arrow D and shown in the dashed lines in FIG. 5. In a further example, the canopy 50 can be configured to include sufficient fabric material 52 and a suitable number of intermediate bows 54c so that the canopy can be deployed to essentially completely enclose the seating area of the seat 22. In such an example, the front edge 56 can be moved in the direction of the arrow D all the way downward and forward into close proximity with a seat bottom of the seat 22 while the rear edge 58 remains positioned in close proximity to the perimeter of the seat back of the seat. Such a canopy 50 could be deployed to create a soothing cocoon-like environment for the seat occupant.

Figure 6A:
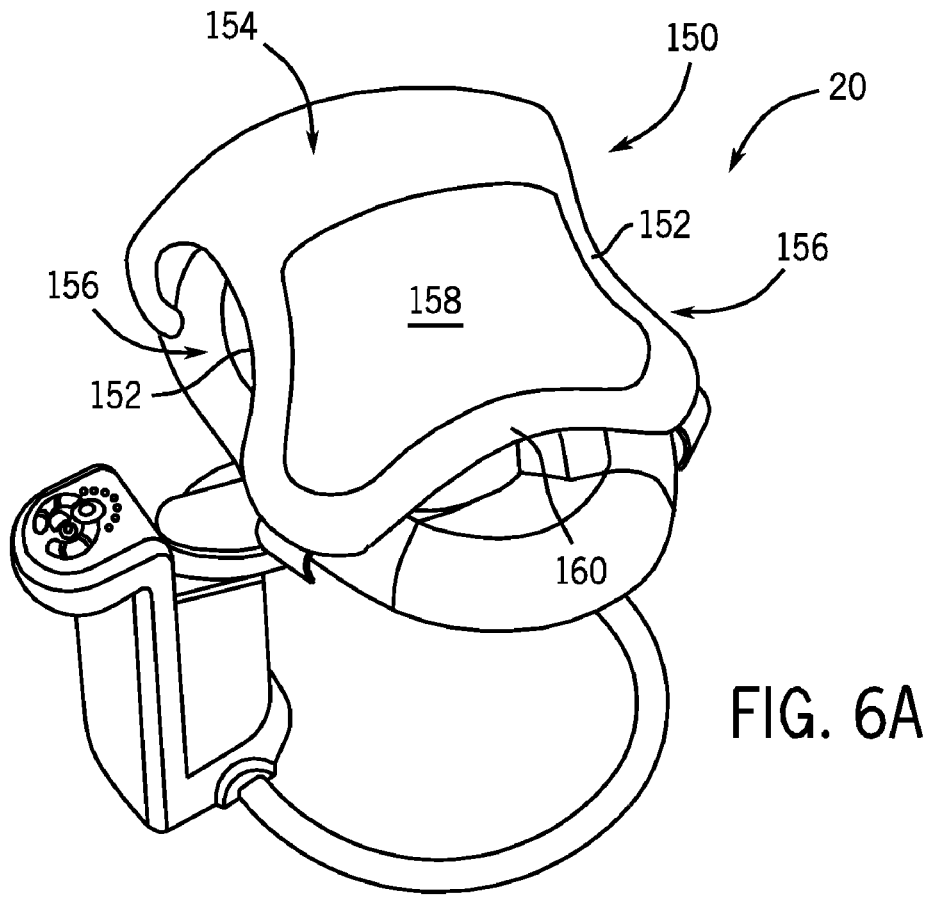
FIG. 6A shows a perspective view of a juvenile product having an alternative example of a canopy according to the teachings of the present invention.
Figure 6B:
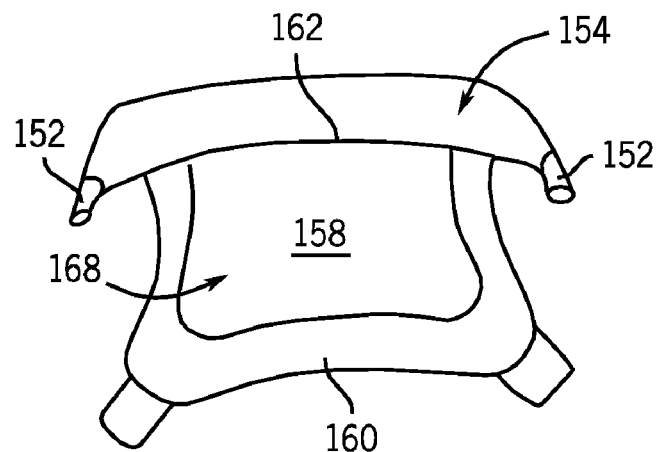
FIG. 6B shows a rear underside view of the canopy shown in FIG. 6A and removed from the product.

FIGS. 6A and 6B show an example of an alternative canopy 150 constructed in accordance with the teachings of the present invention. In this example, the canopy 150 can also essentially cover the entire seating area of the infant product such as the seat 22 on the device 20. As shown in FIG. 12, the canopy 150 can employ a pair of spaced apart front-to-back extending bows 152. A canopy fabric or other material 154 can be stretched and/or slidably movable along the bows 152. In one example, the material 154 can be slid between a stowed position along the bows 152 adjacent one end of the seat 22 and a deployed position stretched over the seating area of the seat 22 as shown. In this disclosed example, the sides 156 beneath the bows 152 are open and yet most of the occupant's viewing area can be covered by the fabric 154 when in the deployed position. Thus, the occupant of the seat can be substantially enclosed under the canopy and yet the open sides can permit free air flow over the child and permit the caregiver to see the child.

FIG. 7 shows another example of the canopy 150, but having an alternative canopy material 154. In the example of FIGS. 6A and 6B, the material 154 has a primarily opaque quality. However, a viewing region 158 is provided in the material 154 and positioned near a forward edge 160. Thus, in this example the material 154 is generally opaque from a rear edge 162 over a majority of the canopy 150. The viewing region 158 in the disclosed example can be formed of a variety of materials, but configured so as to permit a caregiver to view into the seating area of the seat 22 to check on the occupant. In the example of FIG. 7, the canopy material 154 includes a primary opaque material section and two alternate regions 164 and 166 incorporated into the primary material 154. In this example, one of the regions 164 is relatively large and positioned directly in the viewing area of the seating occupant. The second region 166 is positioned near the front edge 160 of the canopy 150. In this example, the second region 166 can be an open mesh material or a transparent material so that a caregiver can view the occupant. The material of the first region can vary and can be configured to enhance or affect images projected on the second region in accordance with the teachings of the present invention described below.

As shown in FIGS. 6A, 6B, and 7, the material of the canopies disclosed herein can vary considerably and yet fall within the spirit and scope of the present invention. In one example, an opaque part of the canopies, such as the canopy 50 or 150, can be nylon, stretch nylon, cotton, or virtually any other fabric suitable for use on juvenile products. The regions 158, 164, and/or 166 can include a translucent, semi-transparent, or even a clear material through which a seat occupant or a caregiver can see. This region, if provided, could be constructed so that it can be selectively covered by a material layer to block these regions, if and when desired. The optional material layer (not shown) can be extendable and retractable as needed. In another example, a transparent mesh material can be utilized in any one of these regions. In another example, the primary canopy material, or a region on the canopy material, can be formed having a one way viewing characteristic. The material can be such that a caregiver may see in but the occupant cannot see out, or vice versa. Alternatively, one or more parts of the interior surface 168 (see FIG. 6B) can be formed so as to provide a projection surface for showing projected images in accordance with the teachings of the present invention as described below.

In the examples described above, the interior or underside surfaces 62 or 168 face the seat 22 when the respective canopies 50 and 150 are deployed. At least a portion of the surfaces 62 and 168 is configured such that it can be positioned directly in view of a seat occupant resting in the seating area of the seat 22. In accordance with one aspect of the teachings of the present invention, the surfaces 62 and 168 can be configured with at least a portion that permits images, light, or other visible stimuli to be projected onto the surface so as to be visible by the seat occupant.

FIG. 8A shows yet another example of a canopy 250 with a portion that overlies a seat back part of the seating area on the seat 22. In this example, the canopy 250 has a fabric 252 that is supported by a wire frame structure 254. The structure 254 has a pair of free ends 256 connected to sides of the seat 22 and a curved shape that creates the canopy configuration including the part that overlies the seating area. In an alternative example, the canopy 250 can alternatively be constructed as a unitary molded structure.

In accordance with the teachings of the present invention, the device 20 can also have a projection system 260 that is configured for projecting images, light, or other visible stimuli. In one example, the imagery or light is projected on the underside of the canopy 250 for the seat occupant's enjoyment. In one example, the images can be for entertainment purposes or to soothe or otherwise relax or occupy the attention of the seat occupant. The projection system 260 can be configured to receive and operate any type of information digital storage medium, such as a CD, DVD, data tape, VHS, or any other storage medium. Alternatively or additionally, the projection system 260 can be configured with on-board memory capability to store its own information and/or to receive downloads from another device or medium. Still further, the projection system 260 can alternatively or additionally be configured to receive a user-selectable or replaceable mask or slide in the form of discs or other suitable shapes that are illuminated to project one or more images. The discs are configured to allow light to selectively pass through, often at varying intensities for shading, and with varying color filtration.

In each example, the projection system 260 can be configured to project images from the device onto a surface. In this example, the projection system 260 is configured to project images onto the underside surface of the seat canopy 250. The projection system 260 can be utilized to convey any type of image from stationary lights to moving lights, from stationary images or pictures to moving images, or from instructional videos to entertainment videos. Sound can also be transmitted, if desired, to accompany the images.

As shown in FIG. 8A, the projection system 260 can include an image projector 262 that is integrated into the components of the device 20. In this example, the projector 262 is electronically coupled to the control electronics of the device 20 and is also physically coupled to a part of the device, such as the seat 22. As shown in FIG. 4, the electrical connection may include or involve the pins 39 inserted into the support arm 30. In the example shown in FIG. 8A, the projector 262 is carried at a top end 264 of the seat 22. As discussed below, the projector 262 can be carried on the other parts of the device 20 and in other locations on a given part.

In one example, the media can be provided that is particularly tailored to specific child development needs at different stages of development, such as soothing, calming, entertaining, educating, or the like. FIGS. 8A-10E show a media progression for different stages of development of a child that can be employed with the projection system and canopy devices shown and described herein. As shown in FIG. 8B, the media in one example can include a plurality of media discs, with each disc carrying specific images or other visual stimuli (e.g., static images or digital video information). In this example, the projector 262 includes a cover 266 that can be opened as shown in FIG. 8C. A selected one of the discs (or other media sources) 268 can be placed in the projector 262 while the cover is open.

Also as shown in FIG. 8B, the media can also include an accompanying book or an array of picture or word books 270 with information that mirrors, corresponds with, or otherwise is related to the digital video information on the discs 268. In this example, the seat 22 is configured with a bar 272 traversing the seating area. The bar 272 in this example is configured to hold a selected one of the books 270 as shown in FIG. 8D. The seat occupant can view images projected from an image output 274 developed via the projector 262 (see FIG. 8C) on the canopy underside. The occupant can also look at the book 270 as desired. In this example, the housing 29 of the juvenile product 20 can have a speaker 276 configured to emit audio for the seat occupant that is relevant to the images and the book 270. Thus, an audio system 277 can be separate from the projection system 260. Alternatively, the projector 262 on the seat back can include a separate speaker to emit sound. The projection system 260 and the speaker 276 can be linked to one another but configured to permit the audio feature to be selectively used independent of the video projection features if desired. Alternatively, the audio feature can emit sounds that accompany the visual images projected onto the canopy. Likewise, the accompanying books 270 can include words and/or images that follow along with the video and audio features of the system.

As represented in FIGS. 8A-8E, a media package can be provided with a DVD or other disc and a book directed to a first stage of infant development, such as for infants from 0 to 3 months old. The video or other images and the book can include age appropriate images for an infant within this first development stage. Accompanying sounds can also be age appropriate and correspond with the images for the infant in this stage.

FIGS. 9A-9E and 10A-10E depict examples of different optional media offered in a progression or series for different stages of child development. The video or visual images can be varied and can become more complex as the age of the seat occupant increases. In this way, the juvenile product may be customizable via the replacement and selection of variable media as the child develops, or as interests change. FIGS. 9A-9E show a representative example of a disc (e.g., slide, DVD, etc.) 280 and a book 282 for infants in a second stage of development, such as from 3-6 months. Similarly, FIGS. 10A-10E show a representative example of a DVD or other disc 290 and a book 292 suitable for children in a third developmental stage, such as for infants between 6 and 12 months.

With the projection system 260 able to receive replaceable and portable media, image products and other media can be created for many different purposes and functions and can be varied according to child age, child gender, or other factors. The image products can also be varied according to purpose such as for education, sleep, soothing, calming, entertainment, or the like.

Figure 11:
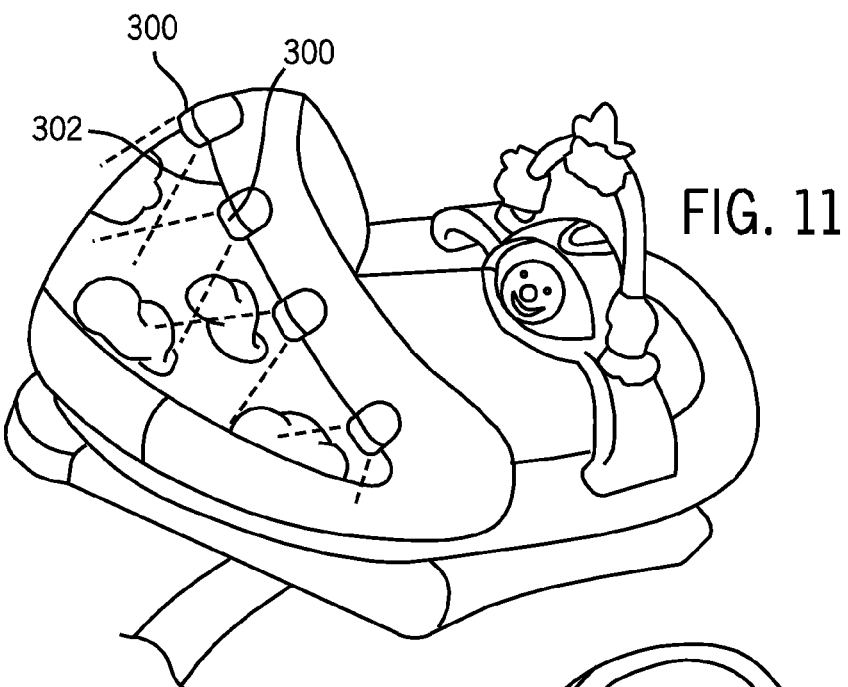
FIG. 11 shows one example of an alternative canopy and projection system with optional features and methods in accordance with the teachings of the present invention.

Many different features and options can be employed to enhance the functionality of the projection system disclosed herein. Many different projection system devices, structures, technological features, and the like can also be utilized. Several such enhancement and other optional features are set forth in connection with FIGS. 11-19. Canopy features can also be altered and employed to further enhance the performance of the disclosed projection system. For example, FIG. 11 shows one example where the canopy fabric can be printed with different colors and/or patterns, which can alter the effect of the displayed images or colors. A light control feature can be added where the intensity, light changing or moving speed, color, or other light characteristics can be altered and controlled at the side of the seat by the seat occupant or caregiver. In this example, a series of LED lights 300 is provided on a perimeter 302 of the canopy to project light over the canopy surface. The lights can be soothing for the seat occupant.

Figure 12A:
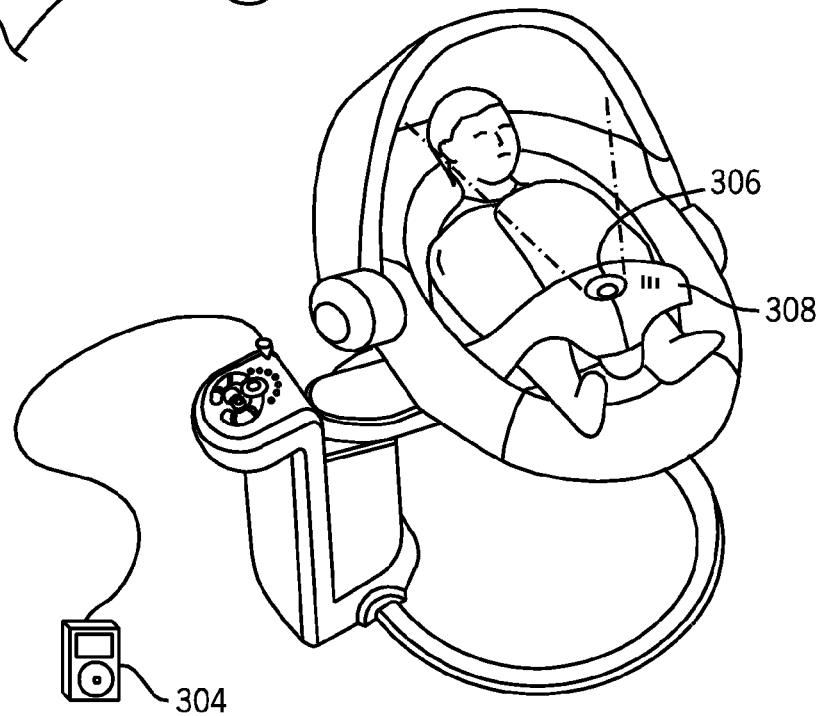
FIGS. 12A and 12B show another example of a juvenile product with a projection system, optional features, and methods in accordance with the teachings of the present invention.
Figure 12B:
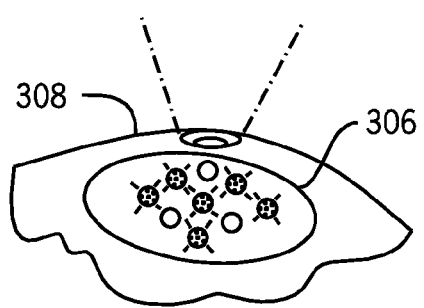

FIGS. 12A and 12B show examples of a child motion product that can receive a download from a video or audio device 304. In this example, a visual projection device 306 is provided on an arm bar 308 of the seat and not on the seat back. The device 306 can include or involve the activation of different colored lights onto the canopy surface above the child's head. The light activation can be timed to coordinate with sound emitted and can be programmed to change as the audio selection changes. The devices can also be programmed to receive and record audio such as from the mother or other caregiver. That recorded audio, video, or both can then be available for future playback. The audio, video, or both can be emitted by the devices so as to mimic womb sounds and sights for soothing infants.

Figure 13:
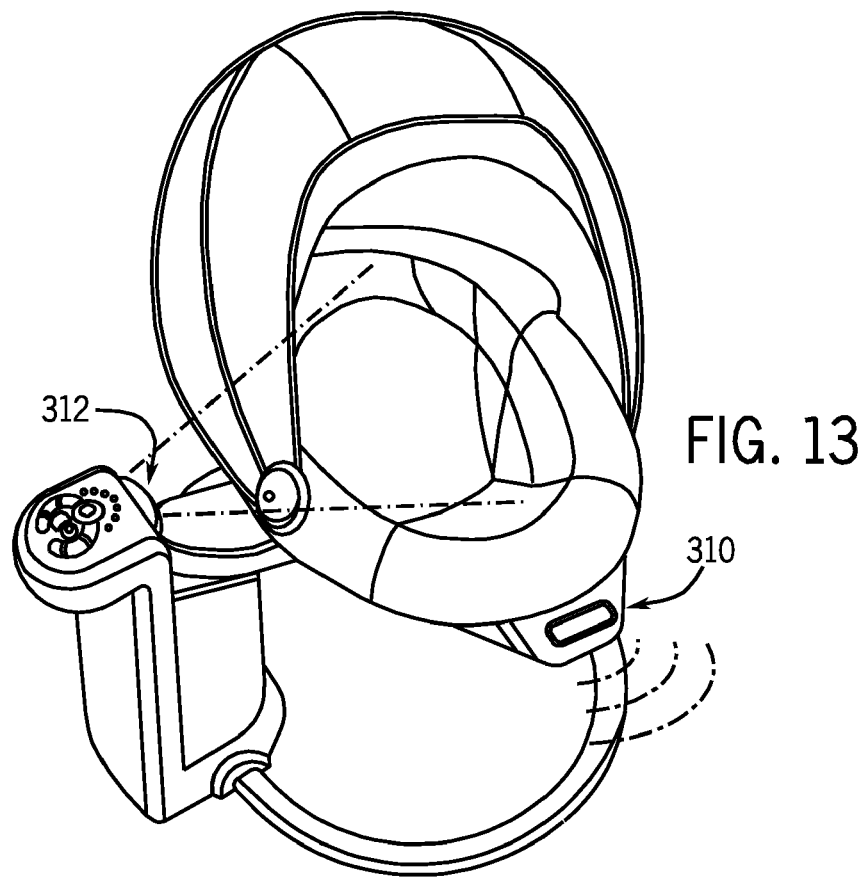
FIG. 13 shows another example of a juvenile product with a projection system, optional features, and methods in accordance with the teachings of the present invention.

FIG. 13 shows that any one or more of a motion device 310, audio system 312, and/or projection system (as described above) can be designed so as to sense the activity level of the seat occupant. In one example, one or more of these devices and systems are configured to include a motion sensor. The audio system 312 and/or the projection system can then be programmed to play audio and/or video suited to the activity level detected. In addition or alternatively, the devices and/or systems can be programmed so as to allow the caregiver to easily select the desired play mode depending on the occupant's activity level.

Figure 14:
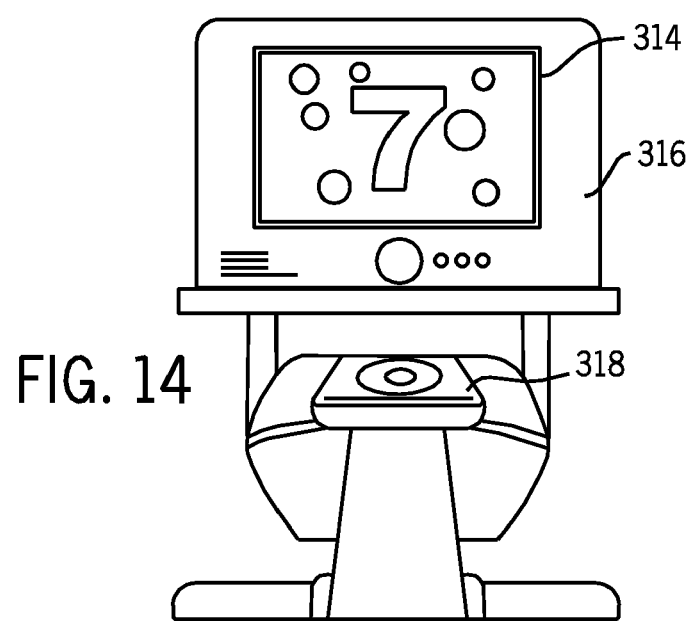
FIG. 14 shows another example of a projection system with optional features and components for a juvenile product in accordance with the teachings of the present invention.

FIG. 14 depicts an alternative embodiment configured to playback audio/visual content via a display screen 314. The display screen 314 may be mounted in a variety of locations on the juvenile product, including, for instance, on the underside surface of a canopy. In the example shown, the display screen 314 may be disposed on a panel 316 suitably located for viewing by the seat occupant. The content may be provided via a portable media source, as described above, such as a DVD disc. Alternatively or additionally, the source of the content may be a playback device 318 coupled or otherwise in communication with the juvenile product.

Figure 15A:
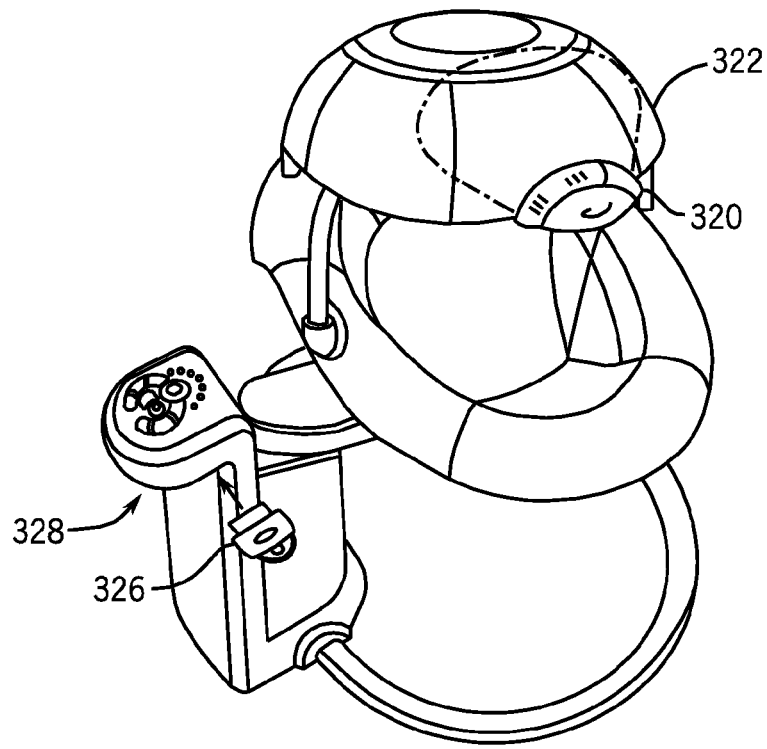
FIGS. 15A-15C show still further optional features that can be employed with the projection system, methods, and juvenile products disclosed herein.
Figure 15B:
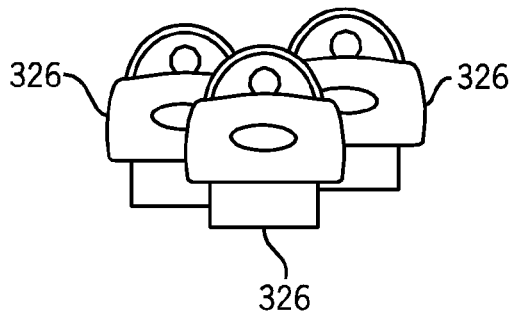
Figure 15C:
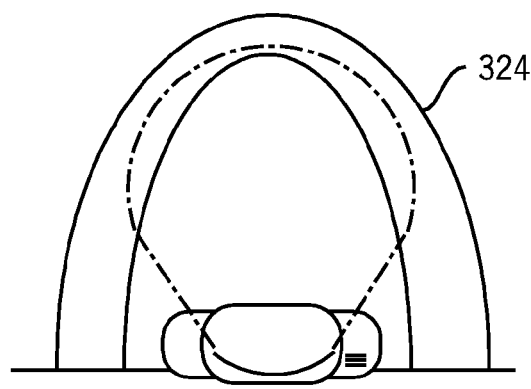

FIGS. 15A-15C show other optional features and alternative examples of projection systems. For example, a projection system 320 can be provided on a canopy 322. The canopy 322 may also vary in shape and configuration. In FIG. 15C, a canopy 324 is umbrella-like and more substantially encloses the seating area. The projected images can be as simple as different color lights projected onto the canopy. The music or sound system in this example can be configured to receive different selectable sound cards 326, "keys" or other products with sound and music options. The sound cards or sound devices can be configured to be received by an audio system 328 of the motion device, the projection system 320, or both. The sound system 328 can be one in the same with the projection system 320 as well.

FIGS. 16-19 illustrate a number of optional alternative modes of operation and features for such products. The devices can be provided to project light or images onto a medium other than a canopy surface. For example, the projection system can be configured to project on a wall facing the occupant, on a ceiling above the occupant, on moisture (e.g., bubbles) emitted above or adjacent the occupant from a fluid (e.g., bubble liquid) tank 330 coupled or attached to the canopy (see FIG. 16), or on a mist or vapor cloud emitted by a humidifier 332 adjacent the device (see FIG. 17). Such a humidifier, bubble machine, or other moisture medium generator can be integrated as a part of the child motion device to any desired extent, from a wholly integrated or attached component or as a product separate from the child motion device.

Figure 16:
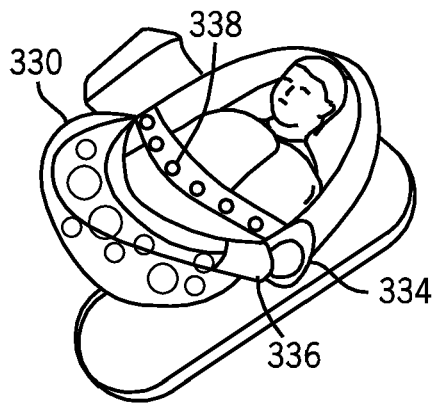
FIGS. 16-19 show still more optional projection features and methods that can be employed with the juvenile products.
Figure 17:
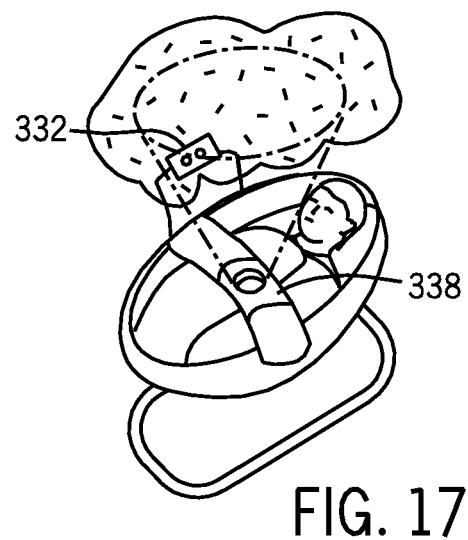

As shown in FIG. 16, a circulator pump 334 can facilitate the creation and/or movement of the bubbles for the entertainment of the child. Lights 336 may also be provided to illuminate the bubbles, which may then be colored as desired. Similarly, a projector or other light source (e.g., LEDs 338) may illuminate the vapor cloud, as shown in FIG. 17. As described above, the bubble or vapor cloud generation may be accompanied by an audio system 338.

Figure 18:
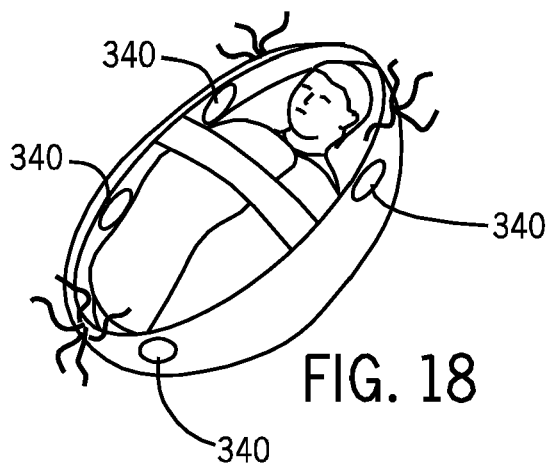
Figure 19:
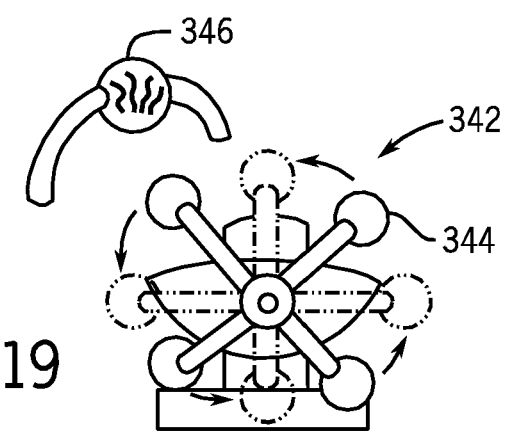

As shown in FIG. 18, one or more motion sensors 340 can be employed to turn on a projection system only when activity of the seat occupant is detected. An illumination or image device can, as noted before, operate in coordination with music or sound as well in response to the detected activity. Also, a device can be provided that illuminates independently in place of a projected image. In one example shown in FIG. 19, a device 342 with multiple globes or orbs 344 is shown wherein the orbs 344 can illuminate to occupy the attention of the infant or child. The device can be stationary or can move in rotary fashion. An alternative orb 346 also shown in FIG. 19 includes a fan or other powered device to create movement within the orb 346.

Figure 20:
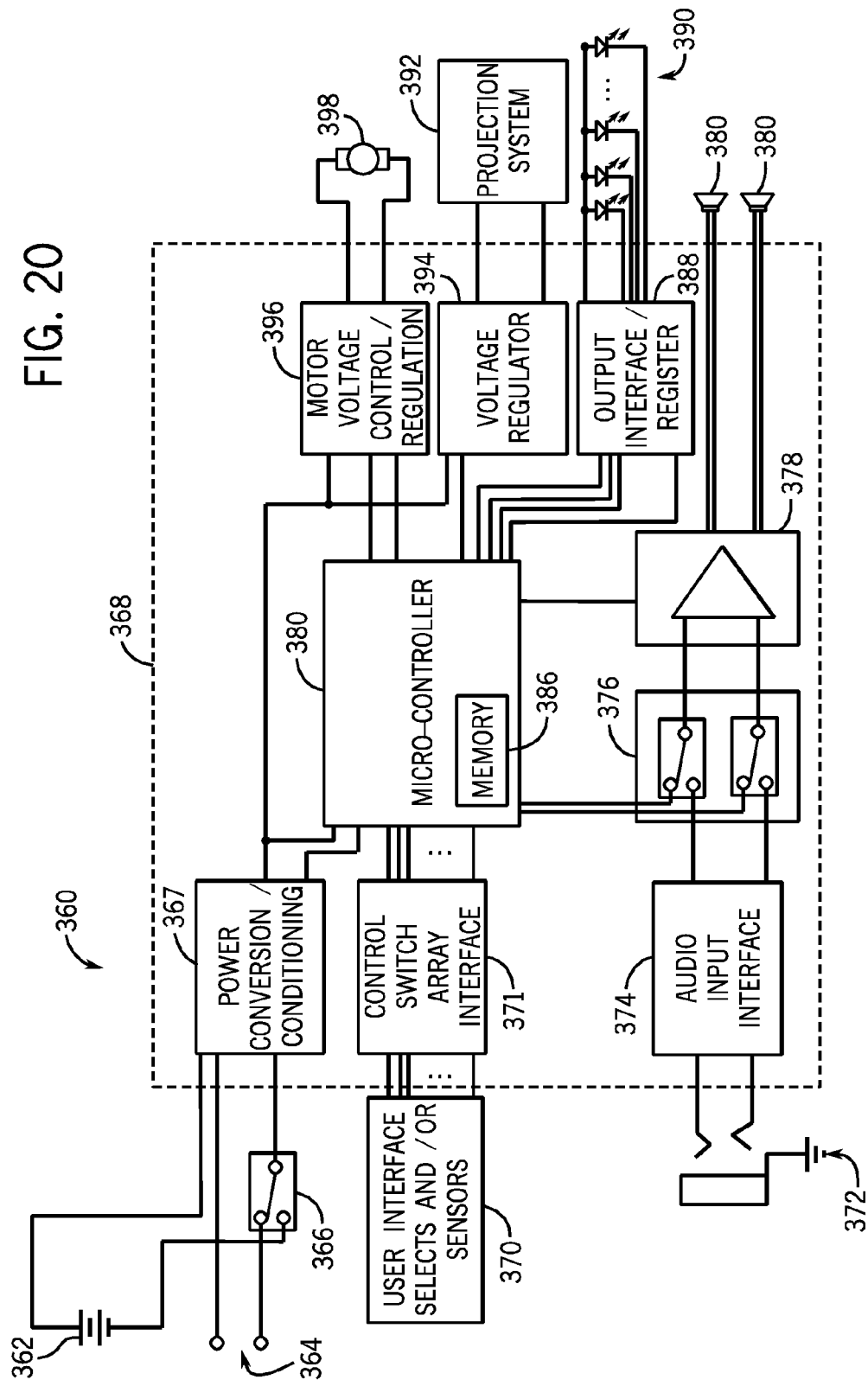
FIG. 20 shows one example of a control circuit for a projection system and other system components integrated with a juvenile product as disclosed herein.

FIG. 20 depicts one example of a control circuit 360 for implementing various aspects of the disclosure, including, for instance, canopy illumination and image projection techniques described above. In this example, the control circuit 360 receives power from either a battery 362 or a pair of AC terminals 364. A switch 366 selects one of the two power sources, and may be driven via the absence or presence of a plug or other interface in the AC terminals 364. The control circuit 360 may be responsible for distributing power to other components of the motion control device, such as input/output elements, projection systems, and an electric motor, as described below. To this end, the control circuit 360 may include a power conversion and/or conditioning circuit 367 configured to provide one or more DC voltage levels to various components of the motion control device, including those within the control circuit 360. In some cases, the power conversion and/or conditioning circuit 367 includes or incorporates the functionality of the switch 366.

The control circuit 360 may, but need not be disposed on a single circuit board (e.g., PCB). In some cases, any one or more of the components shown in FIG. 20 may be disposed on a separate or dedicated board. In this example, however, the control circuit 360 includes a number of components disposed on a circuit board 368. The manner in which input and output connections are made to the circuit board 368 may vary considerably, as desired.

The control circuit 360 receives a plurality of input control signals from user interface selects and/or sensors schematically shown as 370. The user interface selects in this exemplary case involve a corresponding number of binary switches to provide an array of input control signals for directing the operation of the control circuit 360. As described above, other types of user interface elements may be utilized, in which case the nature of the input control signals may vary accordingly. In some cases, the control circuit 360 may receive instructions or other control signals from sources other than a user interface such as the one described above in connection with the post 28 (FIG. 1). The control circuit 360 accordingly includes one or more corresponding input interfaces 371, such as the control switch array interface shown. The control circuit 360 is also configured to receive audio input signals from an audio playback device 372 (e.g., an MP3 player), which may provide left and right stereo signals on respective lines as shown to an on-board audio input interface 374. In other cases, the device 372 may also provide or receive one or more control signals to or from the control circuit 360 for the implementation of related functionality (e.g., volume or track control).

In this example, stereo audio signals are generated by the audio input interface 374 and sent to an analog switch 376 that selects between the external audio source 372 and one or more internal audio sources. The analog switch 376 may be controlled by the caregiver via a user interface select (not shown) or via a control signal generated internally either in response to, or in conjunction with, the activation or selection of a certain source of music or sounds. The output of the analog switch 376 is provided to an amplifier 378, which generates one or more output audio signals for a corresponding number of speakers 380. In the exemplary case shown in FIGS. 1-3, the child motion device 20 includes the single speaker 276 disposed near the instrumentation panel 37 on the control tower 36. A wide variety of alternative configurations involving any number of speakers disposed at different locations on the child motion device 20 may be implemented. Configurations involving more than one speaker, for instance, may be useful in connection with certain aspects of the disclosure involving the generation of audio effects in accordance with the position and motion of the seat, as described below.

The operation of both the analog switch 376 and the amplifier 378 may be controlled by a microcontroller 380 in connection with, for instance, input selection control and volume control, respectively. The microcontroller 380 may, but need not, be involved with controlling the audio/visual control functionality of the control circuit 360. More generally, the microcontroller 380 directs the control of a number of functions and operations implemented or supported by the control circuit 360. More generally, any modules, components, or functions of the control circuit 360 may be integrated onto a single integrated circuit chip to any desired extent, and need not be arranged as shown in FIG. 20. In some cases, one or more additional controllers may be utilized in addition to the microcontroller 380 to address specific tasks, such as the illumination of a canopy, operation of a projection system, playback of music and sounds, or generation of any other media output. For these reasons, the single microcontroller 380 in the circuit diagram of FIG. 20 need not correspond with the physical integrated circuit(s) used to implement the functions and operations of the control circuit 360.

In some exemplary cases, the microcontroller 380 is a programmable system-on-a-chip commercially available from Cypress Semiconductor Corporation (www.cypress.com), such as the chip commercially available as model number CY8C20234. Generally speaking, this microcontroller integrates the functions typically provided by a microcontroller with the functionality of a number of analog and digital components that typically surround microcontrollers. Because this controller can integrate a large number of peripheral functions, the microcontroller 380 and, more generally, the control circuit 360 are shown in simplified form in FIG. 20. For instance, the microcontroller 380 may be configured to implement analog functions, such as amplification, analog to digital conversion, digital to analog conversion, filtering, and comparators. The microcontroller 380 may also be configured to implement digital functions, such as timers, counters, and pulse width modulation (PWM). A number of these analog and digital functions may be used in the control circuit 360 to implement output control functions. The representation of the microcontroller 380 shown in FIG. 20 depicts some of this functionality by separately identifying a memory 386 (e.g., flash memory), although this module constitutes only one of many available.

With continued reference to FIG. 20, the exemplary control circuit 360 also includes one or more output interfaces and/or registers 388 directed to driving a plurality of user interface, canopy lighting, or other illumination elements of the child motion device. In this example, the child motion device includes a set of light emitting diodes (LEDs) 390 that may, for instance, be disposed on the canopy 50 (FIG. 5). Alternative embodiments may include any number of illumination elements or other visual elements to soothe the child occupant or provide information to the caregiver.

As described above, the child motion device may also include a projection system schematically depicted in FIG. 20 at 392. In some cases, the projection system 392 may be powered locally. Alternatively or additionally, the projection system 392 may be both controlled and powered via the control circuit 360. To those ends, a control signal generated by the microcontroller 380 may be provided to a voltage regulator 394 responsible for providing power to the projection system 392.

Further voltage control and/or regulation is provided by a regulator 396 for an electric motor 398 directed to the principal motion of the device. The operation of the regulator 396 is also controlled by the microcontroller 380.

The projection system technology can vary considerably. Wired LEDs or lamps can be mounted or attached to the canopy. Electrical power can be provided by the main child motion device unit or a local unit within the canopy or seat structure. The LEDs or lamps can be mounted throughout the canopy's shape. They could be powered through wires installed in tunnels sewn into the canopy fabric or by conductive ink or a flexible circuit screen printed onto the canopy's fabric. Connections between the main unit housing, the seat, and the canopy can provide contacts to deliver sound and power as well. Fiber-optic cables attached to the canopy or woven into the canopy fabric can also be used to provide light or images. These cables can transmit light from a central source and disperse it throughout the canopy. The light and power source can be attached to the canopy structure, the seat, or simply connected to the canopy but mounted remotely from the canopy.

An electronic module of any suitable type can be employed that emits light within the canopy region or projects light or images on the canopy region or child seat. The module can be attached to the canopy, its support structure, the seat, or any part of the child motion device base, housing, or frame assembly. The module can be powered separately or can be powered as part of the child motion device's main power source. The light source can project a simple colored beam of light or it may illuminate or project an image or picture. This projected image can also be a user selectable or replaceable slide film. A mechanism for constant pulsing or fading lighting may also be included. The source can also be mounted front back, or either side of the seating area.

These various examples can be integrated into an infant product focused on providing a secure, comfortable, and soothing environment. The examples can also be integrated into products for entertaining, educating, calming, and occupying older infants and children. These examples can also provide additional benefit to both the infant or child and the caregiver by creating new ways for the parents to interact with their child and the product and by providing new soothing features that will help calm a fussy baby.

There may certainly be other methods of accomplishing the examples presented above. The disclosed examples are not intended to be limiting as to the scope of the invention. The disclosed examples describe new solutions to problems that caregivers encounter when attempting to soothe their fussy infants and to interact with their children. Many of the disclosed examples employ new electro-mechanical technologies to products such as infant swings and other motion devices to bring a new level of functionality not found on the market currently.

References to the storage of data or information in connection with the implementation of any of the above-described techniques shall be understood to include the recordation of the data or information in any type of memory device or medium accessible by the juvenile product. Accordingly, references to memory, storage, etc. may, but need not, involve the memory 386 of the microcontroller 380. Thus, the juvenile products described herein may include or involve one or more memories or storage media either integrated or discrete from the circuit elements described above.

Embodiments of the disclosed systems, devices, routines, techniques, and methods described above may be stored and/or implemented via hardware, firmware, software, or any combination thereof. Some embodiments may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion.

The programs may be implemented in a high level procedural or object oriented programming language to communicate with any type of processing system. The programs may also be implemented in assembly or machine language, if desired. In fact, practice of the disclosed systems, devices, routines, techniques, and methods is not limited to any particular programming language. In any case, the language may be a compiled or interpreted language.

The programs may be stored on a storage media or device (e.g., floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the disclosed systems, devices, routines, techniques, and methods may also be considered to be implemented as a machine-readable storage medium, configured for use with a processing system, where the storage medium so configured causes the processing system to operate in a specific and predefined manner to perform the functions described herein.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

Although certain juvenile products and projection systems, devices, features, and methods have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A juvenile product comprising:
  a frame assembly;
  a seat having a seat bottom and a seat back supported by the frame assembly for reciprocating movement of the seating area, the seat bottom and the seat back defining a seating area;
  a canopy having a front edge, a rear edge, and a fabric region between the front and rear edges, the canopy being deployable over the seating area with the front edge positioned at the seat bottom and the rear edge positioned at the seat back, and the fabric region having an underside that faces the seating area; and a projection system carried on the juvenile product and having a projector configured to project visible stimuli onto at least part of the underside of the fabric region during the reciprocating movement.

2. A juvenile product according to claim 1, wherein the projection system is configured to receive a portable media source of the visual stimuli.

3. A juvenile product according to claim 2, wherein the portable media source comprises a projection slide.

4. A juvenile product according to claim 2, wherein the portable media source comprises a digital storage medium.

5. A juvenile product according to claim 1, further comprising an audio system to playback audio content.

6. A juvenile product according to claim 5, wherein the audio system is configured to receive audio content from a media playback device.

7. A juvenile product according to claim 1, further comprising a bar traversing the seating area and configured to engage a book.

8. A juvenile product according to claim 7, wherein the visual stimuli are related to content provided via the book.

9. A juvenile product according to claim 8, wherein the visual stimuli and the content provided via the book are portions of a stage in a media progression for different developmental stages of an occupant of the seat.

10. A juvenile product comprising:
a frame assembly;
a seat having a seating area supported by the frame assembly;
a moisture medium generator to emit a moisture medium above the seating area; and
a projection system carried on the juvenile product and having a projector configured to project visible stimuli on the moisture medium above the seating area and visible by an occupant of the seat.

11. A juvenile product according to claim 10, wherein the moisture medium generator comprises a humidifier such that the medium comprises mist.

12. A juvenile product according to claim 10, wherein the moisture medium generator comprises a bubble generation machine such that the medium comprises bubbles.

13. A juvenile product according to claim 10, wherein the projection system is configured to receive a portable media source of the visual stimuli.

* * * * *